US007480711B2

(12) United States Patent
Lownsbrough et al.

(10) Patent No.: US 7,480,711 B2
(45) **Date of Patent: *Jan. 20, 2009**

(54) SYSTEM AND METHOD FOR EFFICIENTLY FORWARDING CLIENT REQUESTS IN A TCP/IP COMPUTING ENVIRONMENT

(75) Inventors: Derek Leigh Lownsbrough, Kelowna (CA); Paul Leslie Archard, Westbank (CA)

(73) Assignee: Packeteer, Inc., Cupertino, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 11/292,970

(22) Filed: Dec. 2, 2005

(65) Prior Publication Data

US 2006/0085559 A1 Apr. 20, 2006

Related U.S. Application Data

(63) Continuation of application No. 09/846,117, filed on Apr. 30, 2001, now Pat. No. 7,003,572.

(60) Provisional application No. 60/272,420, filed on Feb. 28, 2001.

(51) Int. Cl.
*G06F 15/173* (2006.01)

(52) U.S. Cl. ........................ 709/223; 709/224; 709/226; 709/227; 718/104; 718/105

(58) Field of Classification Search ................. 709/203, 709/223, 226, 227, 238, 104, 105, 224; 718/104, 718/105

See application file for complete search history.

(56) References Cited

U.S. PATENT DOCUMENTS

| | | | | |
|---|---|---|---|---|
| 5,521,910 | A * | 5/1996 | Matthews | 370/256 |
| 6,308,238 | B1 * | 10/2001 | Smith et al. | 709/227 |
| 6,542,468 | B1 * | 4/2003 | Hatakeyama | 370/238 |
| 6,606,643 | B1 * | 8/2003 | Emens et al. | 718/105 |
| 6,836,756 | B1 * | 12/2004 | Gruber | 370/242 |
| 7,003,572 | B1 * | 2/2006 | Lownsbrough et al. | 709/227 |
| 7,072,304 | B2 * | 7/2006 | Ng et al. | 370/254 |
| 7,174,312 | B2 * | 2/2007 | Harper et al. | 705/35 |
| 7,328,267 | B1 * | 2/2008 | Bashyam et al. | 709/227 |
| 7,331,048 | B2 * | 2/2008 | Skovira | 709/233 |
| 2002/0174217 | A1 * | 11/2002 | Anderson | 709/224 |

* cited by examiner

*Primary Examiner*—Ramy M Osman
(74) *Attorney, Agent, or Firm*—Baker Botts L.L.P.

(57) ABSTRACT

A system and method for efficiently forwarding client requests from a proxy server in a TCP/IP computing environment is described. A plurality of transient requests are received from individual sending clients into a request queue. Each request is commonly addressed to an origin server. Time estimates of TCP overhead, slow start overhead, time-to-idle, and request transfer time for sending the requests over each of a plurality of managed connections to the origin server are dynamically calculated, concurrent to receiving and during processing of each request. The managed connection is chosen from, in order of preferred selection, a warm idle connection, an active connection with a time-to-idle less than a slow start overhead, a cold idle connection, an active connection with a time-to-idle less than a TCP overhead, a new managed connection, and an existing managed connection with a smallest time-to-idle. Each request is forwarded to the origin server over the selected managed connection.

26 Claims, 12 Drawing Sheets

Determine TTI
110
Request received?
111
Yes
Estimate response size
112
TTI = TTI + connection speed × (request size + response size)
113
No
Data written to socket?
114
Yes
TTI = TTI - connection speed × amount written
115
No
Data read from socket?
116
No
Yes
Response header data read?
117
No
TTI = TTI - connection speed × amount read
118
Yes
Adjust TTI to reflect actual response size
119
Return TTI
120

SYSTEM AND METHOD FOR EFFICIENTLY FORWARDING CLIENT REQUESTS IN A TCP/IP COMPUTING ENVIRONMENT

CROSS-REFERENCE TO RELATED APPLICATION

The present application is a continuation application of U.S. patent application Ser. No. 09/846,117 filed Apr. 30, 2001 now U.S. Pat. No. 7,003,572, which is incorporated by reference herein in its entirety. This patent application also claims priority under 35 U.S.C. §119(e) to provisional patent application Ser. No. 60/272,420, filed Feb. 28, 2001, the disclosure of which is incorporated by reference.

FIELD OF THE INVENTION

The present invention relates in general to proxy service and, in particular, to a system and a method for efficiently forwarding client requests from a proxy server in a TCP/IP computing environment.

BACKGROUND OF THE INVENTION

Proxy servers, or simply "proxies," are playing an increasingly important role in network traffic load balancing and management. Generically, a proxy is. any type of device situated within a network intermediate to a set of end-user clients and one or more origin servers. Some forms of proxy are pass-through devices that provide specific services complimentary to those services provided by the origin servers, such as providing firewall protection or packet validation. Other "active" proxies attempt to speed up and improve end-user response times by replicating origin server functionality, such as through content caching.

The latter form of proxy functions as a surrogate to an origin server. In a Web environment, for example, surrogate proxies can be highly effective in off-loading origin server workloads when used to cache and serve static or relatively unchanging Web content. Each surrogate proxy receives requests from individual clients and directly provides responses using information content staged from the origin server and locally stored. However, these same proxies are relegated to functioning as pass-through devices when used to provide dynamic content. Dynamic content includes personalized Web pages as well as any form of content subject to change on a per-request basis. This type of content can only be provided by the origin servers and cannot be cached in proxies. Accordingly, each surrogate proxy merely forwards individual requests to an origin server and returns any response received back to the requesting client.

Thus, both "active" and "surrogate" proxies generate pass-through requests. A pass-through request is a transaction that is forwarded by a proxy to an origin server. By functioning as pass-through devices, these proxies can add to network overhead through inefficient proxy-origin server connection management, particularly when operating with connection-oriented protocols, such as the Transmission Control Protocol (TCP). Preferably, a relayed proxy forwards requests destined for an origin server over one or more existing connections. However, individual client requests are often queued by the proxy and inefficiently forwarded to the origin server using the next available connection or via a new connection without regard to existing connection status. In the worst case, every request could be sent on a separate connection, thereby incurring resource and processor allocation costs for connection set up and termination, plus actual request transmission overhead. Poor proxy-origin server connection management can lead to poor response times and packet congestion. The proxy thereby becomes a network traffic bottleneck.

In the prior art, systems for improving proxy performance are licensed by Cacheflow (www.cacheflow.com), Sunnyvale, Calif.; Inktomi (www.inktomi.com), Foster City, Calif.; Network Appliance (www.networkappliance.com), Sunnyvale, Calif.; and Squid (www.squid-cache.org). These systems focus primarily on the connections between clients and proxies and generally incorporate some form of caching of frequently accessed data. Thus, these solutions are directed primarily to addressing cache freshness and the retrieval of resources from the cache. While these cache freshening techniques ensure that the data in the cache is current with the origin server data, these systems fail to improve upon or optimize the connection between proxies and origin servers.

Similarly, a system for reusing persistent connections between an origin server and clients is described in A. Feldmann et al., "Performance of Web Proxy Caching in Heterogeneous Bandwidth Environments," Proc. of the IEEE, INFOCOM '99 Conference (1999), the disclosure of which is incorporated by reference. This system has been shown to improve response times by reducing TCP overhead. A persistent connection to a proxy can be reused for requests from another client through "connection caching." However, each connection cache requires a persistent connection to a given content provider, regardless of the number of clients connected to the proxy. Consequently, network resources dedicated to support those content providers that are infrequently requested are needlessly wasted.

Likewise, a system for providing persistent connection reuse is provided by the Webscaler product, licensed by NetScaler (www.netscaler.com), Santa Clara, Calif. Client requests are directed, multiplexed, and funneled into high-speed server sessions. However, the persistent connection reuse improves overall response times only in part and fails to select an existing connection or open a new connection based on proxy-origin server connection status.

Therefore, there is a need for an approach to efficiently forwarding requests received from a plurality of clients to a proxied server. Preferably, such an approach would substantially maximize the utilization of existing connections and minimize idle and slow start times.

SUMMARY OF THE INVENTION

The present invention provides a system and method for managing connections between a proxy server and a destination server. Request, expected response, and connection attributes are used to determine the connection along which each request will be sent to achieve the substantially fastest response from the destination server. The proxy server is situated between clients making requests and destination servers to which the requests are bound. The management of the proxy server's outbound connections is isolated so multiple client requests bound for the same destination server can be multiplexed onto the managed connections. By using one or more attributes of the managed connection and one or more attributes of a specific request-response pair, the outbound connection providing the substantially fastest response time is selected to service each incoming client request.

An embodiment of the present invention is a system and a method for efficiently forwarding client requests in a distributed computing environment. A plurality of non-proxiable requests commonly addressed to an origin server is received from individual sending clients. Time estimates of service availability based on a time-to-idle for sending requests over each of a plurality of connections to the origin server are dynamically generating, concurrent to and during processing of each request. The connection to the origin server with a substantially highest service availability and a substantially lowest time-to-idle is selected. Each request is forwarded to the origin server using the selected connection.

A further embodiment is a system and method for efficiently forwarding client requests from a proxy server in a TCP/IP computing environment. A plurality of transient requests is received from individual sending clients into a request queue. Each request is commonly addressed to an origin server. Time estimates of TCP overhead, slow start overhead, time-to-idle, and request transfer time for sending the requests over each of a plurality of managed connections to the origin server are dynamically calculated, concurrent to receiving and during processing of each request. The managed connection is chosen from, in order of preferred selection, a warm idle connection, an active connection with a time-to-idle less than a slow start overhead, a cold idle connection, an active connection with a time-to-idle less than a TCP overhead, a new managed connection, and an existing managed connection with a smallest time-to-idle. Each request is forwarded to the origin server over the selected managed connection.

Accordingly, the present invention provides an approach to selecting the optimal proxy-origin server connection for forwarding client requests with improved response times. Incoming client requests are forwarded to origin servers using the fastest possible connection with maximum resource re-utilization and processor allocation.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
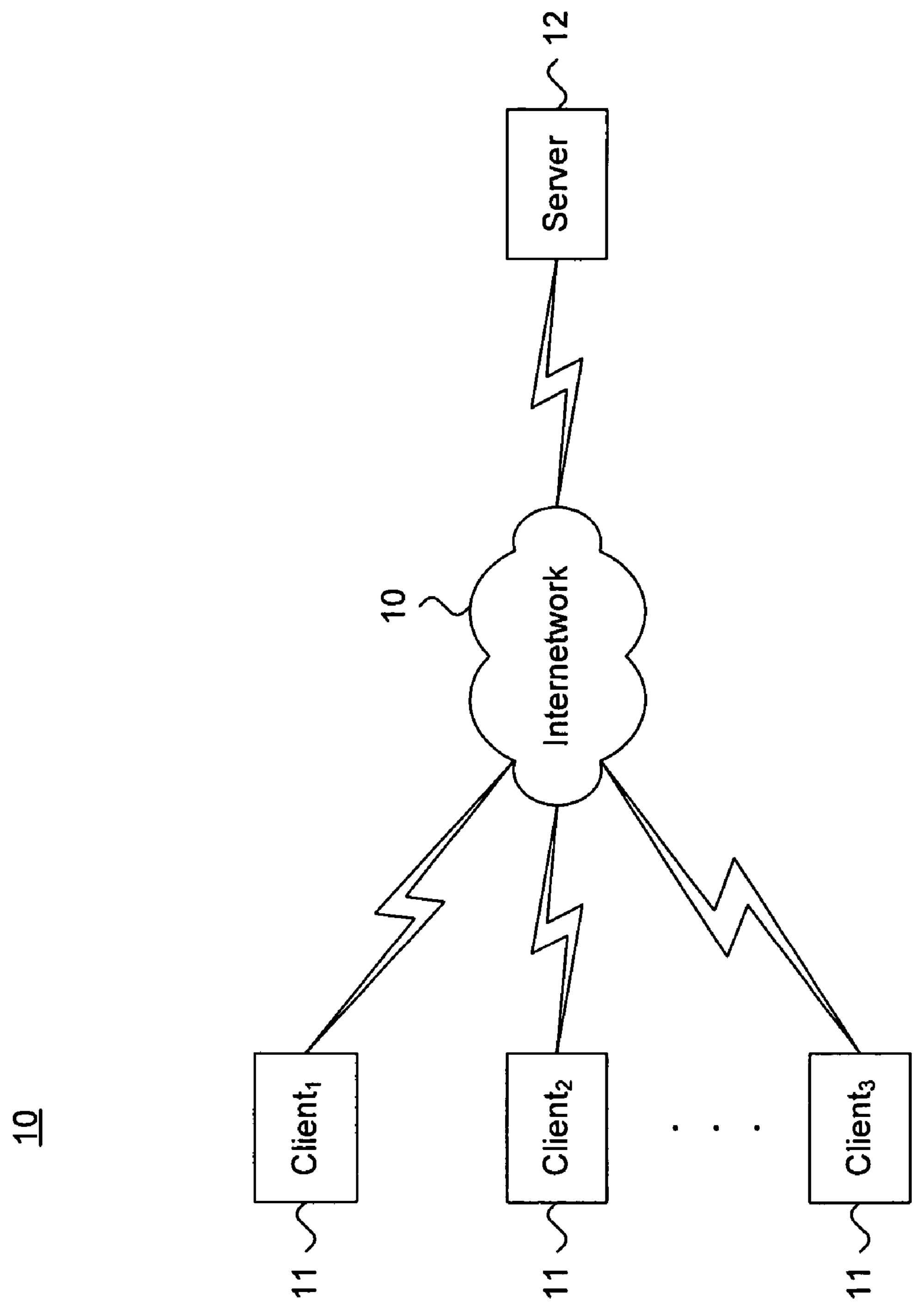
FIG. 1 is a network diagram showing a prior art system for processing requests in a distributed computing environment.

FIG. 1 is a network diagram showing a prior art system for processing requests in a distributed computing environment 10. A set of clients 11 are remotely connected to a common server 12 via a network connection, such as an intranetwork or internetwork 13, including the Internet. During communication sessions, the clients 11 send requests bound for the common server 12 and receive content served re-utilization. The individual requests are arbitrarily generated and routed to the common server 12. However, the common server 12 has finite resources. During request heavy loads, the common server 12 is inundated with requests and can become saturated. In turn, the infrastructure supporting the common server 12 also becomes saturated and provides poor response times.

Figure 2A:
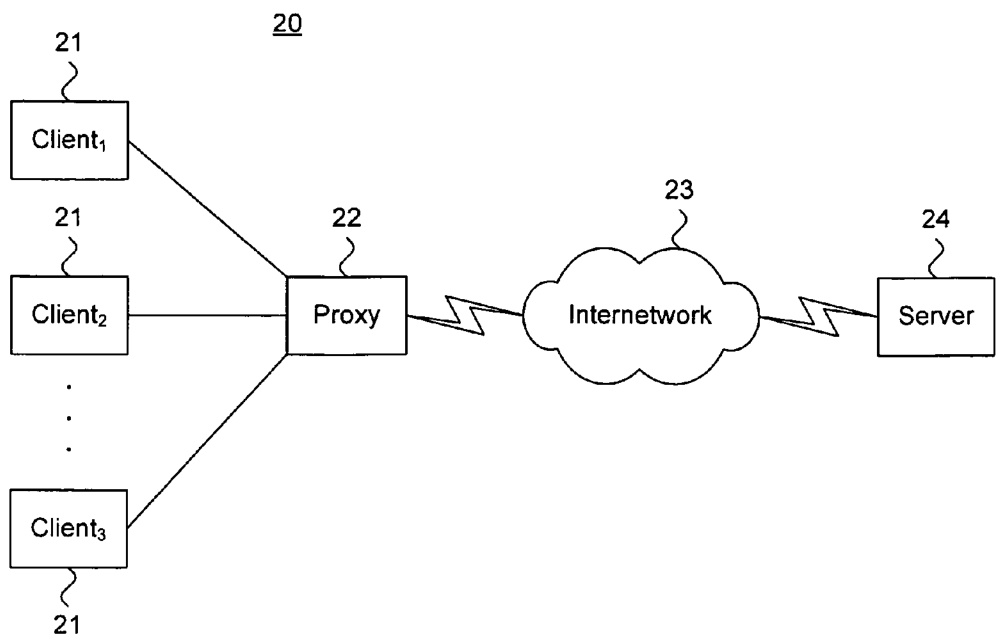
FIGS. 2A-2C are network diagrams showing a system for efficiently forwarding client requests from a proxy server in a TCP/IP computing environment in accordance with the present invention.
Figure 2B:
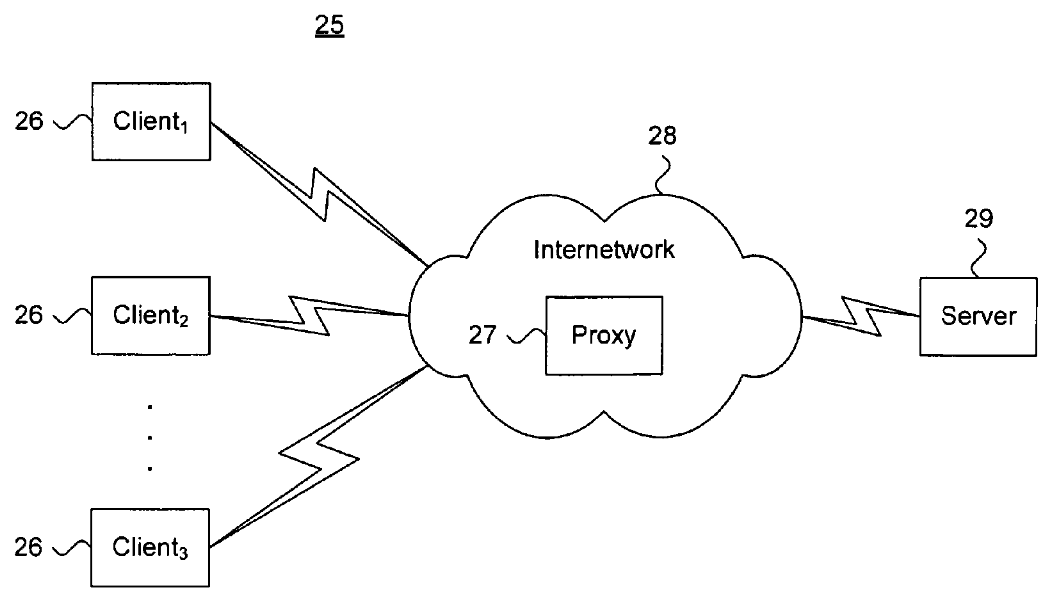
Figure 2C:
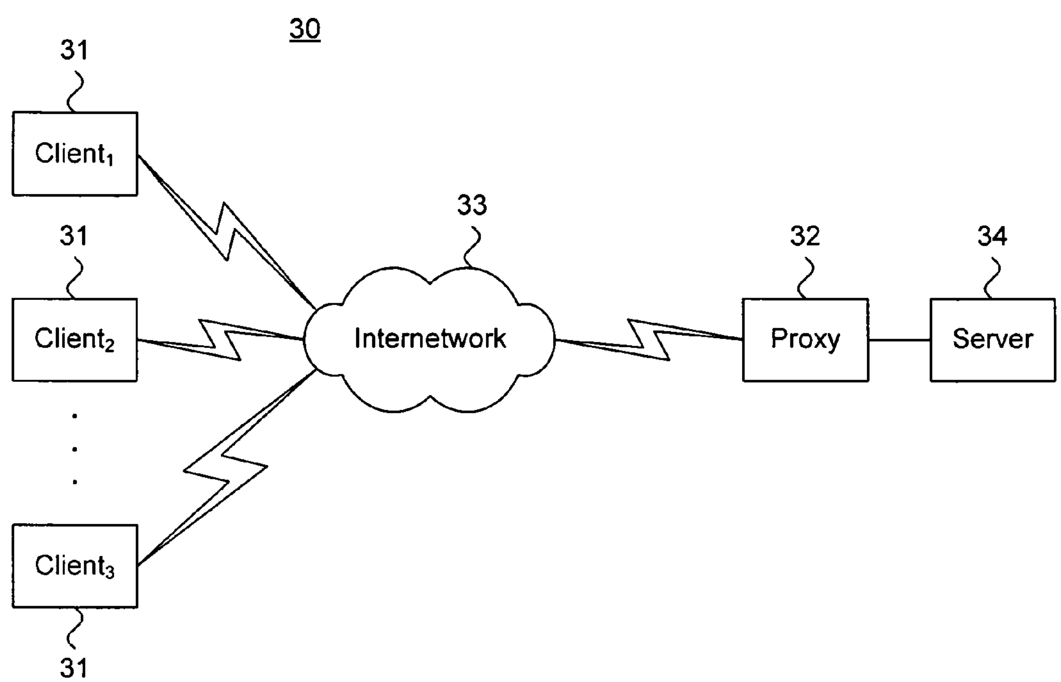

One solution to alleviating server and infrastructure traffic load is to position proxy servers (proxies) at some point intermediate to the request-generating clients and the response-serving servers. FIGS. 2A-2C are network diagrams showing systems 20, 25, 30 for efficiently forwarding pass-through client requests to origin servers 24, 29, 34 in a TCP/IP computing environment in accordance with the present invention. A pass-through request is a transaction that is forwarded by a proxy to an origin server. Proxies 22, 27, 32 are situated between the clients 21, 26, 31 and an origin server 34, 39, 34 to buffer and service, if possible, the request traffic.

Referring first to FIG. 2A, a distributed computing environment 20 with a proxy 22 located local to a plurality of clients 21 is shown. The proxy 22 is connected to an origin server 24 over a network, such as an intranetwork (not shown) or internetwork 23, such as the Internet. The connection between the proxy 22 and origin server 24 is actively managed by the proxy 22. The management of the outbound connections of the proxy 22 is isolated so multiple requests from the individual clients 21 bound can be multiplexed onto managed connections. As further described below, beginning with reference to FIG. 4, the proxy analyzes the attributes of the managed connection and of specific request and response pairs to determine the outbound managed connection providing the substantially fastest response time for each incoming client request.

Referring next to FIG. 2B, a distributed computing environment 25 with a proxy 27 incorporated into the infrastructure of a network, including an intranetwork or intemetwork 28, is shown. As before, requests are received from a plurality of individual clients 26 for forwarding to an origin server 29. The connection between the proxy 27 and origin server 29 is managed by the proxy 27 and the connection providing the substantially fastest response time is selected for forwarding client requests.

Referring finally to FIG. 2C, a distributed computing environment 30 with a proxy 32 located local to an origin server 34 is shown. Multiple requests are received from a plurality of clients 31 interconnected to the proxy 32 over a network, including an intranetwork or intemetwork 33. The connection between the proxy 32 and the origin server 34 is managed by the proxy 32 and the connection providing the substantially fastest response time is selected for forwarding client requests.

In each of the foregoing embodiments, the request from the clients 21, 26 and 31 are received and queued by their respective proxies 22, 28 and 33. The proxies generate time estimates and determine the managed connection with highest service availability.

The ability to multiplex multiple client requests onto a set of managed connections is largely dependent upon the nature of the application protocol used. In particular, the protocol must allow for persistent connections and treat each request on the connection as a unique entity. The ordering of requests is not crucial nor is the originating client of the request. In the described embodiment, the individual clients 21, 26, 31, proxies 22, 27, 32 and servers 24, 29, 34 communicate, at the transport layer, using the transmission control protocol (TCP) such as described in W. R. Stevens, "TCP/IP Illustrated, Volume 1, " Chs. 1, 17-24, Addison Wesley Longman (1994), the disclosure of which is incorporated by reference. TCP is a transport protocol providing a connection-based, reliable transmission service. The individual clients 21, 26, 31, proxies 22, 27, 32 and servers 24, 29, 34 communicate, at the application layer, using the hypertext transfer protocol (HTTP), Version 1.1, to communicate web content between the various nodes, such as described in W. R. Stevens, "TCP/IP Illustrated, Volume 3, " Ch. 13, Addison Wesley Longman (1996), the disclosure of which is incorporated by reference. HTTP persistence and pipelining allow an HTTP client to establish a persistent connection to a server and to issue multiple requests without incurring the penalty of TCP connection establishment.

The individual computer systems, including the proxies 22, 27, 32, servers 24, 29, 34 and clients 21, 26, 31 computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 3:
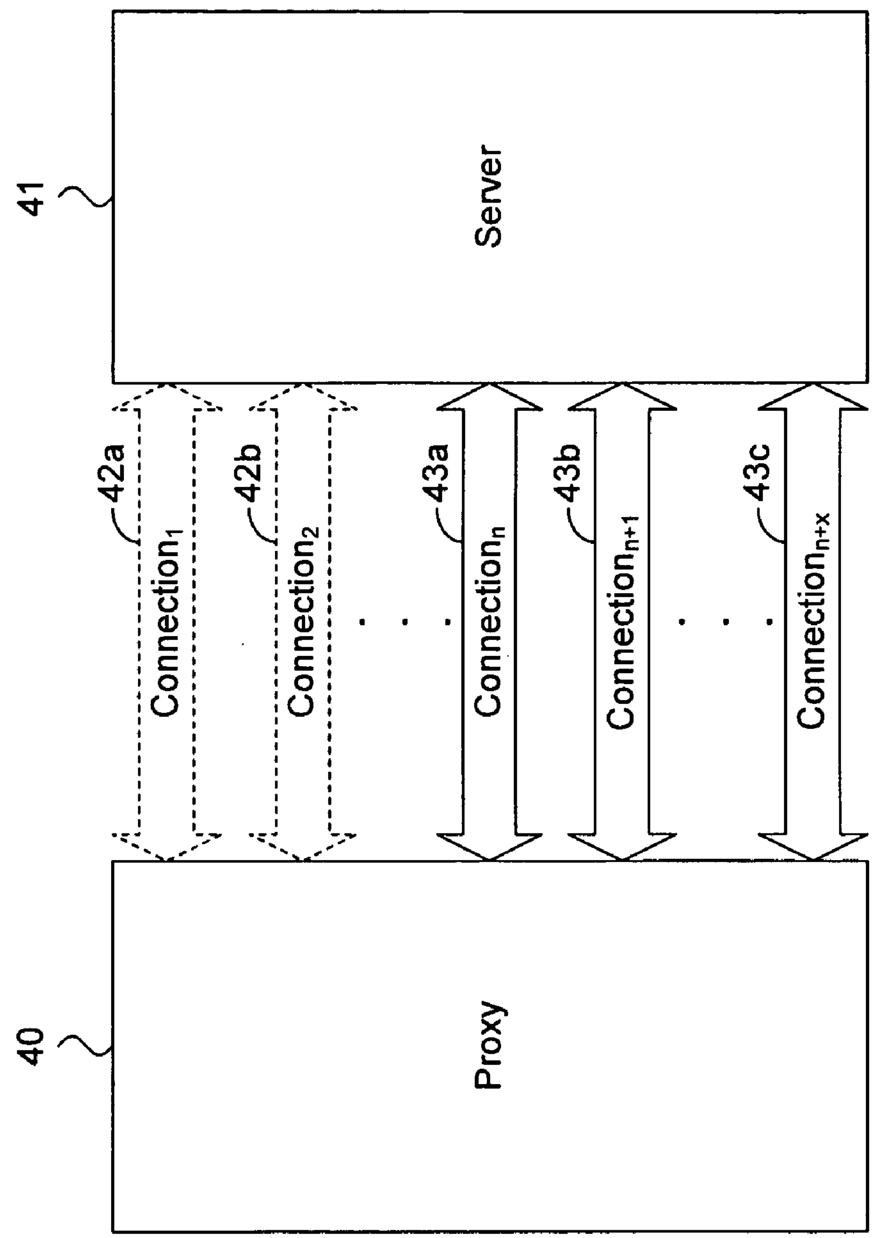
FIG. 3 is a block diagram showing a prior art proxy server with unmanaged origin server connections.

To emphasize the importance of using managed connections, FIG. 3 is a block diagram showing a prior art proxy server 40 with unmanaged connections to an origin server 41. "Unmanaged" means that a new connection is created for each proxy request. Consequently, a series of short-lived transient connections 42*a*, 42*b* are constantly set up, executed and terminated on a continuing basis. Each new active connection 43*a*-43*c* incurs significant, and duplicative, overhead in set-up and termination, resulting in poor response times and the wasting of resources and processor allocations. Although the proxy 40 buffers the origin server 41 from having to queue and directly respond to every individual client request, the efficiencies gained through the use of the proxy 40 are significantly diminished by the unmanaged nature of the connections.

Figure 4:
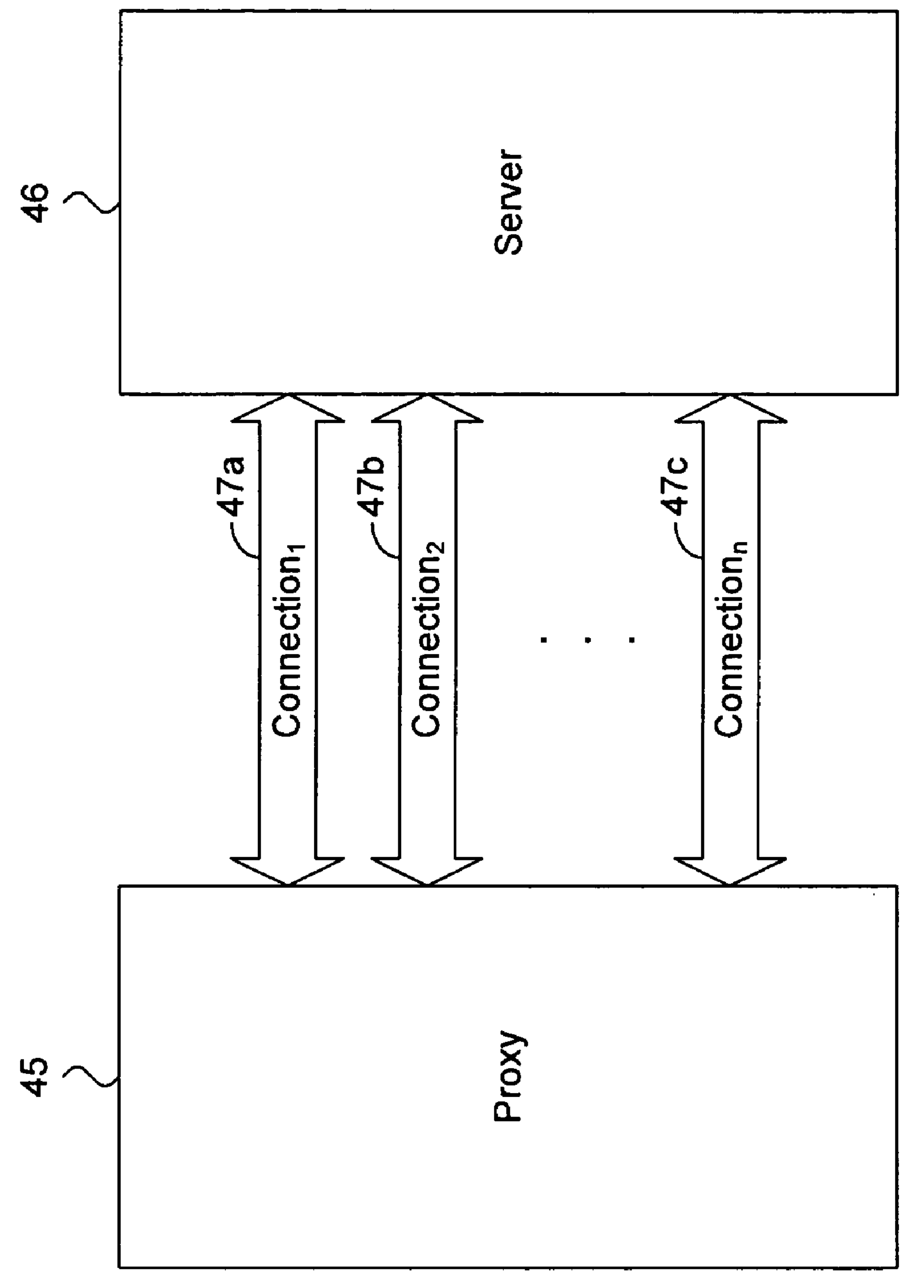
FIG. 4 is a block diagram showing the proxy server of FIGS. 2A-2C with managed origin server connections.

FIG. 4 is a block diagram showing the proxy server 45 of FIGS. 2A-2C with managed origin server connections. A set of persistent connections 47*a*-47*c* between the proxy 45 and origin server 46 are managed by the proxy 45. The proxy 45 multiplexes each incoming request onto one of the persistent connections 47*a*-47*c*. Pass-through requests are forwarded by the proxy 45 to the origin server 46 after determining time estimates of service availability and selecting the persistent connection providing the substantially fastest service. The use of a managed set of persistent connections optimizes server resource utilization and reduces the number of short-lived connections that the origin server 46 must handle.

Figure 5:
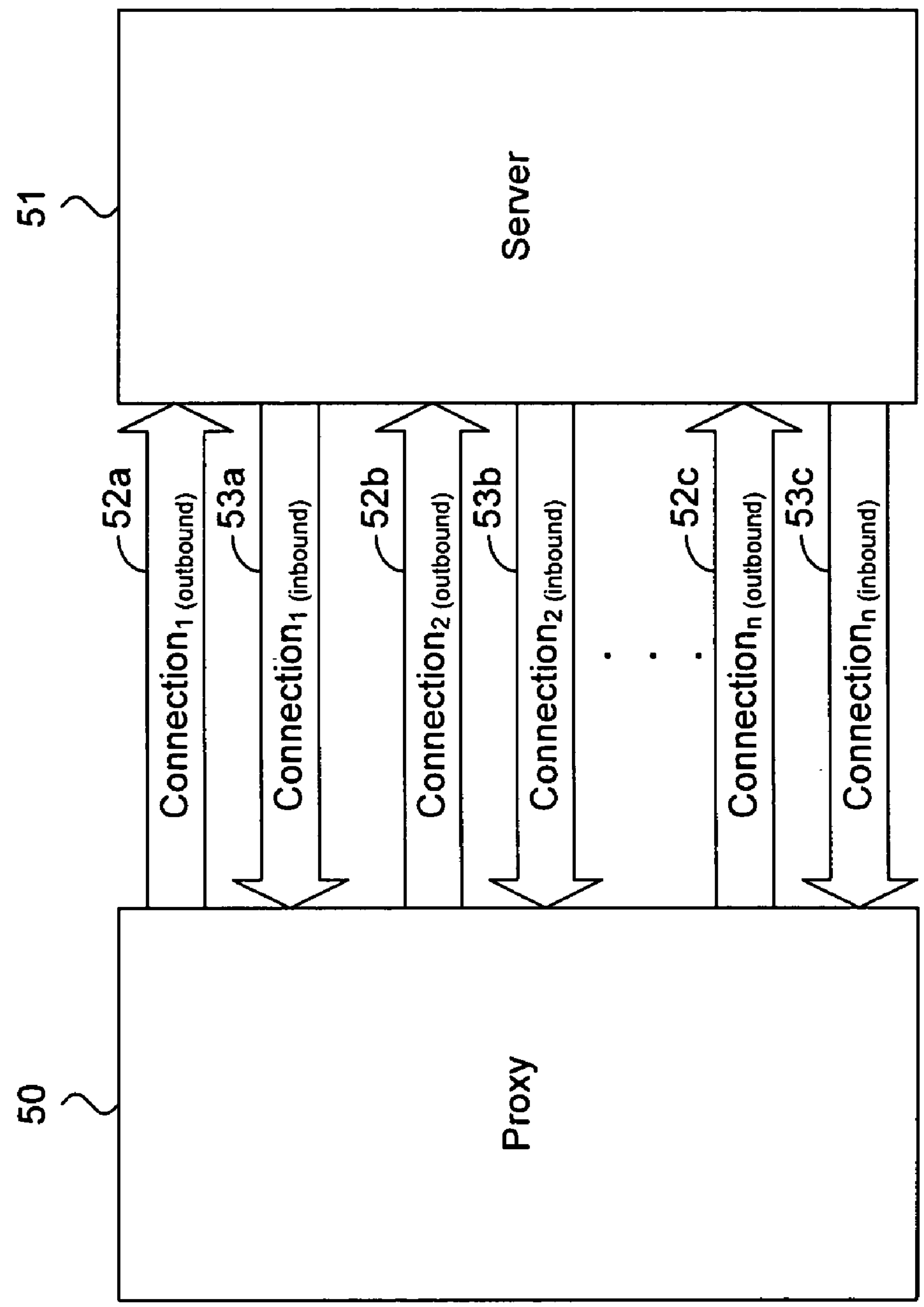
FIG. 5 is a block diagram showing the proxy server of FIGS. 2A-2C with managed and pipelined origin server connections.

FIG. 5 is a block diagram showing the proxy server 50 of FIGS. 2A-2C with managed and pipelined origin server connections. The proxy 50 multiplexes incoming requests onto a single outgoing connection to origin server 51. However, using pipelining, the individual connections can be logically separated into outbound connections 52*a*-52*c* and inbound connections 53*a*-53*c*. Pipelining allows the proxy 50 to forward a client request on an outbound connection 52*a*-52*c* before the entire response to a previous request is received on an inbound connection 53*a*-53*c*. Pipelining enables the most efficient utilization of proxy-origin server connections.

Figure 6:
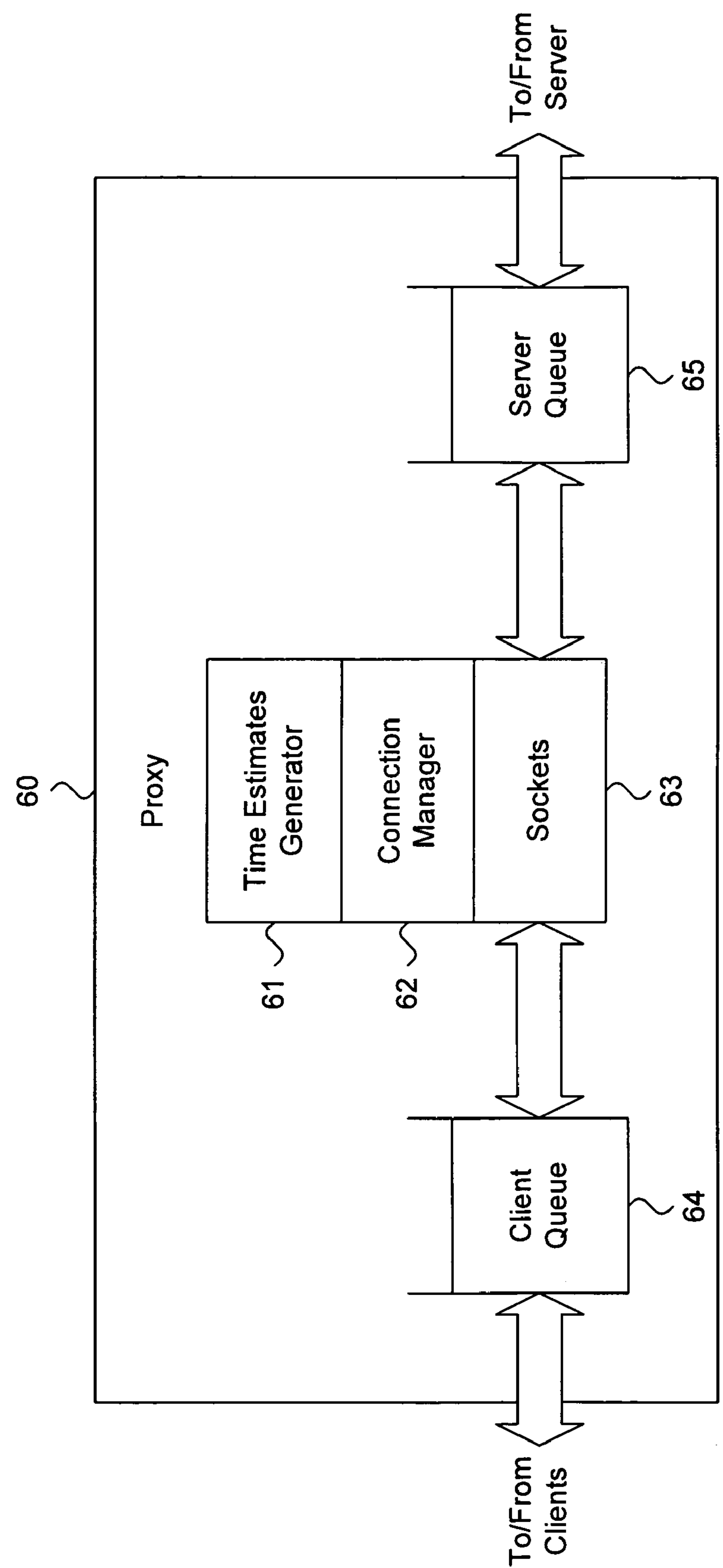
FIG. 6 is a block diagram showing the software modules for implementing the proxy server of FIGS. 2A-2C.

FIG. 6 is a block diagram showing the software modules for implementing the proxy 60 of FIGS. 2A-2C. Each module is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The proxy server 60 operates in accordance with a sequence of process steps, as further described below beginning with reference to FIG. 7.

The proxy 60 includes three main modules: time estimates generator 61, connection monitor 62 and sockets module 63. During execution, the proxy 60 stages incoming client requests and outgoing client responses in client queue 64 and incoming server requests and outgoing server responses in server queue 65. The sockets module 63 presents a kernel layer interface to a network protocol stack (not shown). The incoming and outgoing requests and responses are received and sent via the sockets module 53 by opening a socket and reading data to and from the socket. The actual transport of messages across the network is handled by the network stack as is known in the art.

The connection manager 62 determines the outbound connection from the proxy 60 to the requested origin server using the attributes of the connection and data being transferred. The connection manager 62 operates in conjunction with the time estimates generator 61 which calculates four dynamic time estimates: TCP overhead, time-to-idle (TTI), idle time, and request transfer time.

These four time estimates are used by the connection manager 62 to determine whether the current client request should be sent on a connection that is currently processing a previous request (active connection), an idle connection that is warm, an idle connection that is cold, or a new connection. A warm idle connection does not incur additional overhead resulting from TCP slow start, while a cold idle connection does. Slow start provides congestion control by enabling a sending client to incrementally increase the number of outgoing segments up to the window size of the receiving host without overloading the network infrastructure. Slow start provides flow control imposed by the sender whereas window size provides flow control imposed by the receiver. Slow start is described in W. R. Stevens, "TCP/IP Illustrated, Volume 1, " pp. 285-287, Addison Wesley Longman (1994), the disclosure of which is incorporated by reference.

Figure 7:
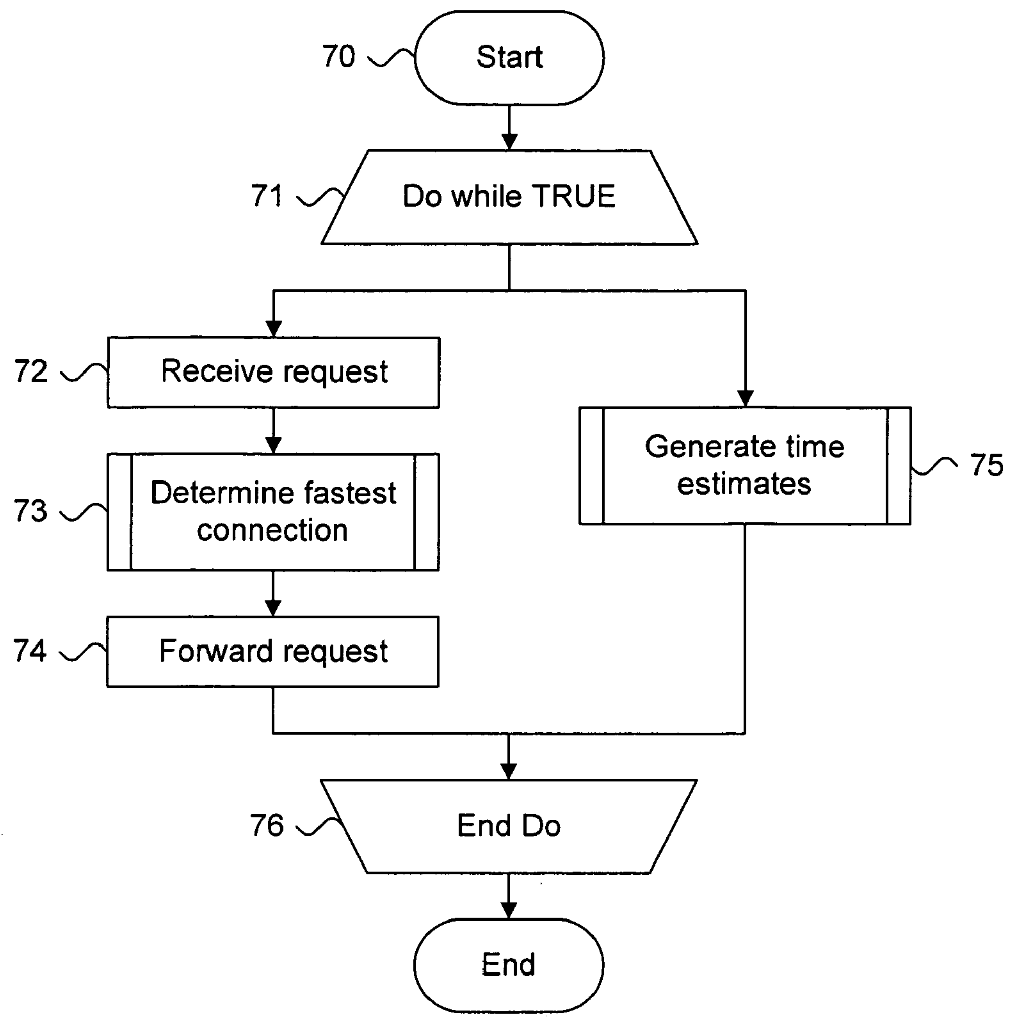
FIG. 7 is a flow diagram showing a method for efficiently forwarding client requests from a proxy server in a TCP/IP computing environment in accordance with the present invention.

FIG. 7 is a flow diagram showing a method for efficiently forwarding pass-through client requests 70 in a distributed computing environment in accordance with the present invention. The method operates as a continuous processing loop (blocks 71-76) in which incoming client requests are received and forwarded to their requested origin server while concurrently generating time estimates. As would be recognized by one skilled in the art, other operations also occur concurrently, including the receipt and dispatch of server requests and responses and proxy operations performed by the proxy itself, the description and illustration of which are omitted for clarity of presentation.

Only pass-through requests are forwarded. These requests could be, for example, requests for non-cacheable content. Alternatively, the proxy could be a pass-through proxy that performs functions as an adjunct to the origin server, such as providing a firewall or packet validation. Pass-through proxies generally operate transparent to the origin server and forward all requests.

During each cycle (blocks 71-76), an incoming client request is received (block 72) and the fastest connection time is determined (block 73), as further described below with reference to FIGS. 8A-8B. Once determined, the client request is forwarded using the substantially fastest connection (block 74) and the cycle begins anew. Concurrently, time estimates are generated (block 75), as further described below with reference to FIG. 9, concurrent to the receipt of incoming client requests (block 72). Processing of incoming client requests and fastest connection time determinations (blocks 71-76) continue until the program is terminated.

Figure 8A:
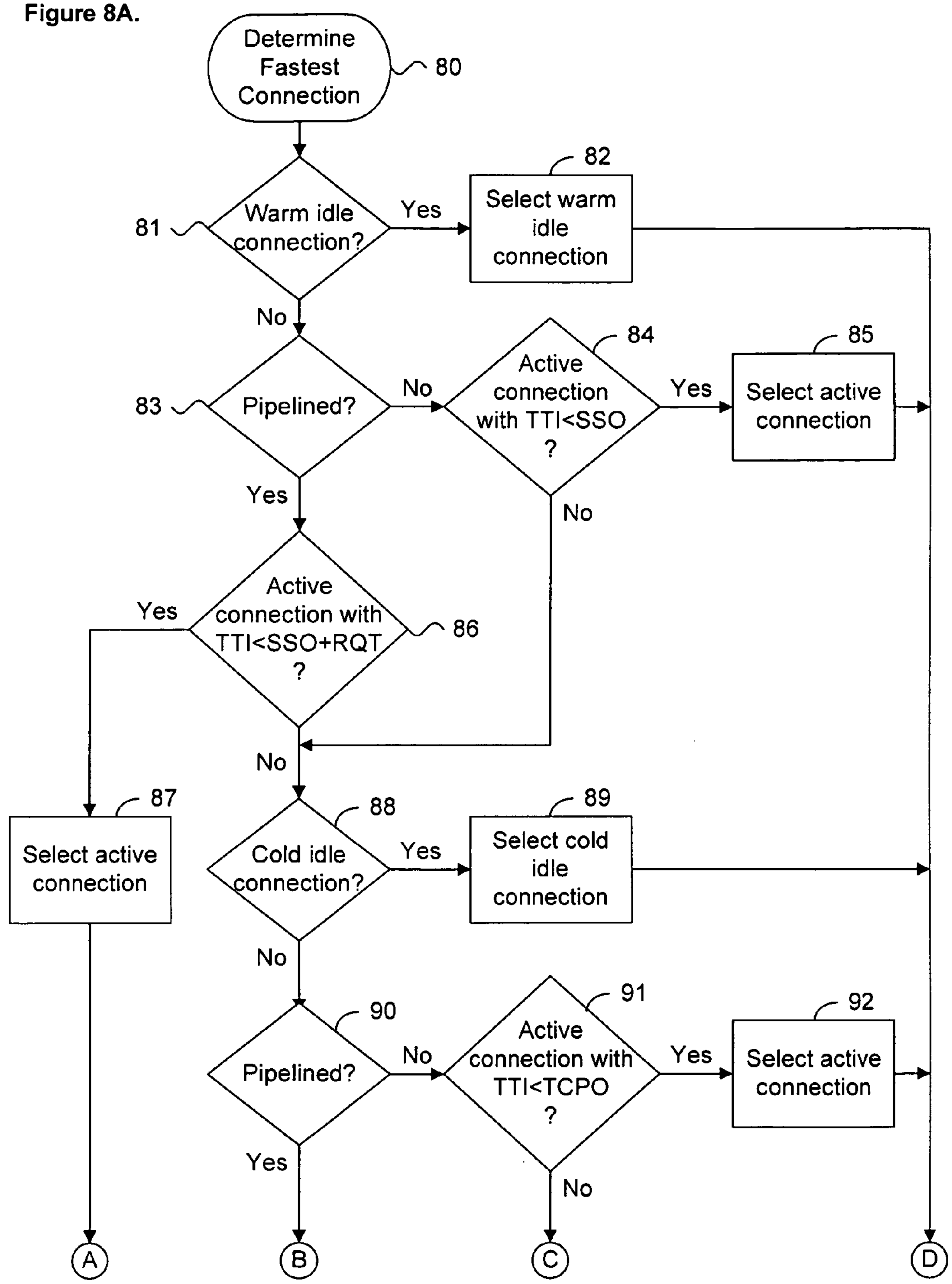
FIGS. 8A-8B are flow diagrams showing the routine for determining a fastest connection for use in the method of FIG. 7.
Figure 8B:
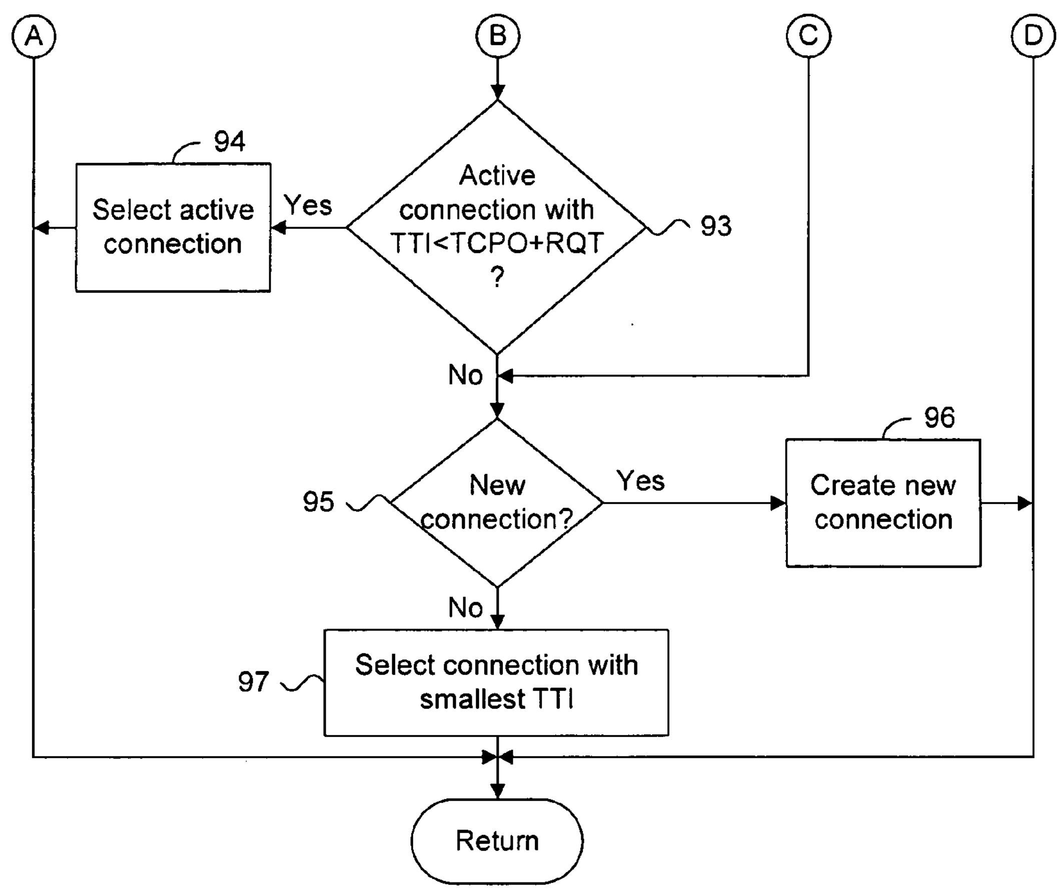

FIGS. 8A-8B are flow diagrams showing the routine for determining a fastest connection 80 for use in the method 70 of FIG. 7. The purpose of this routine is to select from between the four types of connections to an origin server. The routine utilizes the time estimates generated concurrent to the receipt of each incoming client request. In the described embodiment, the clients, proxies and servers communicate, at the transport layer, implement TCP and, at the application layer, implement HTTP, although other comparable protocols could also be utilized, as would be recognized by one skilled in the art.

Each incoming client request is forwarded to the origin server over one of the four types of connections: an active connection, a warm idle connection, a cold idle connection, or a new connection. An active connection is a managed, persistent connection that is currently processing data. A warm idle connection is a connection that does not incur TCP slow start overhead whereas a cold idle connection does.

Briefly, connections are selected in a preferred ordering. First, a warm idle connection is a connection that is immediately available for forwarding an incoming client request to an origin server. An active connection can become available upon the expiration of the time-to-idle, plus request time if pipelined, provided the time-to-idle is less than the slow start overhead. A cold idle connection is a connection that is available upon the completion of slow start overhead. An active connection could take longer to become available than a cold idle connection if the time-to-idle, plus request time if pipelined, exceeds the slow start overhead but is still less than the overall TCP overhead. As a last resort, a new connection is faster than an active connection if the time-to-idle of the active connection exceeds the TCP overhead plus request time if pipelined.

In more detail, if the data transfer rate of connections to a particular origin server are held constant, the fastest response times result from sending a request on a warm idle connection. Thus, a warm idle connection is selected (block 82) if available (block 81). Otherwise, the next fastest connection would be an active connection with a time-to-idle (TTI) less than slow start overhead (SSO), provided the communication protocol does not allow pipelined requests (block 83). Such an active connection is selected (block 85) if available (block 84). If pipelining is supported (block 83), the request transfer time (RQT) must also be added to the slow start overhead (block 86) before selecting an active connection (block 87). As described above with reference to FIG. 5, pipelining allows an incoming client request to be forwarded to an origin server before the entire response to a previous request is received back by the proxy. Otherwise, the next fastest connection would be a cold idle connection which is selected (block 89) if available (block 88).

If neither a warm idle connection, cold idle connection, nor active connection with time-to-idle less than slow startup overhead, plus request time if pipelined, are available, an active connection is again considered. Provided the communication protocol does not allow pipelined requests (block 90), an active connection with a time-to-idle less than the sum of the TCP overhead plus request time is selected (block 92) if available (block 91). If pipelining is supported (block 90), the request transfer time (RQT) must also be added to the TCP overhead (block 93) before selecting an active connection (block 94).

Finally, if neither a warm idle connection, a cold idle connection, nor active connection is available or suitable, a new connection is considered. Thus, a new connection is created (block 96) if possible (block 95). Otherwise, the connection with the smallest time-to-idle is selected (block 97) as a default. The routine then returns.

To illustrate the foregoing selection operations, consider, by way of example, the following scenario:

Request transfer time of request to send: 4.0 seconds

TCP overhead for connections to origin server: 3.0 seconds, including 2.0 seconds for TCP overhead and 1.0 second for slow start overhead Per Table 1, the connections types and the time required to send a client request over each connection are shown. The connections with smaller times are preferable and yield the best response times for the request.

TABLE 1

| Connection Type | Time Before Origin Server Can Respond To Request | |
|---|---|---|
| Warm Idle | 4.0 seconds | |
| Cold Idle | 5.0 seconds | |
| New | 7.0 seconds | |
| | Pipelining | |
| | With | Without |
| Active − TTI = 1.0 | 4.0 seconds | 5.0 seconds |
| Active − TTI = 2.0 | 4.0 seconds | 6.0 seconds |
| Active − TTI = 3.0 | 4.0 seconds | 7.0 seconds |
| Active − TTI = 4.0 | 4.0 seconds | 8.0 seconds |
| Active − TTI = 5.0 | 5.0 seconds | 9.0 seconds |

If pipelining is supported, the sending of the request can be interleaved with the receiving of current responses to reduce latency since TCP connections are full duplex. For high latency connections, interleaving can offer significant performance gains.

Figure 9:
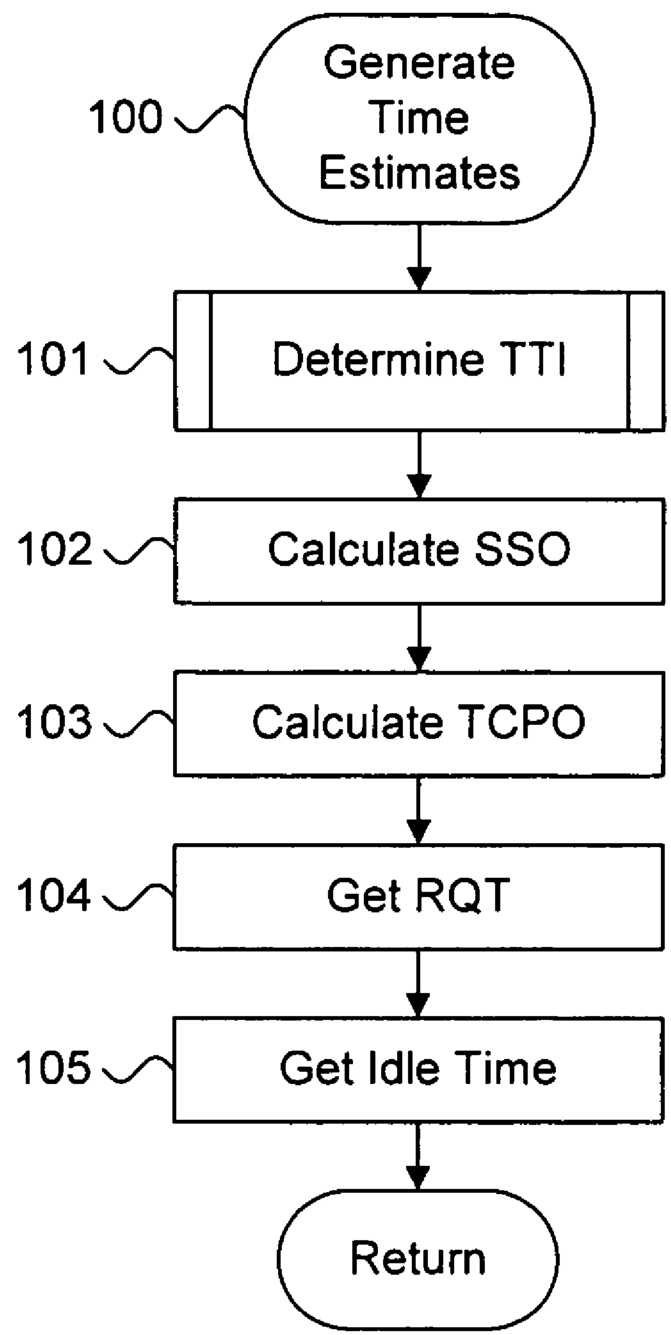
FIG. 9 is a flow diagram showing the routine for generating time estimates for use in the method of FIG. 7.

FIG. 9 is a flow diagram showing the routine for generating time estimates 100 for use in the method 70 of FIG. 7. The purpose of this routine is to generate the four time estimates used to determine the substantially fastest connection over which to forward a client request. Although described with reference to the TCP and HTTP communication protocols, one skilled in the art would recognize that similar operations could be performed on other communication protocols. This routine operates concurrently to the operations of receiving, selecting a connection and forwarding an incoming client request and continuously updates the time estimates and, in particular, the time-to-idle, as requests are processed.

First, the time-to-idle (TTI) is determined concurrently to the processing of requests (block 101), as further described below with reference to FIG. 10.

Next, the slow start overhead (SSO) is calculated (block 102). The time lost due to slow start overhead depends on the TCP segment size and the size of the request and response pairs. Per Equation 1, slow start overhead SlowStartOH depends upon whether the amount of data ready to send is greater than the TCP segment size. If so, the number of round trip times due to slow start can be calculated as follows:

$$SlowStartOH = RTT * \left\{ceiling\left(\frac{BytesToSend}{ServerMSS}\right) + ceiling\left(\frac{BytesToReceive}{ProxyMSS}\right)\right\} \quad \text{Equation 1.}$$

where RTT is the roundtrip time between the proxy and the origin server and MSS is the maximum TCP segment size. The maximum TCP segment size is unique for each end of the connection.

Note that an established idle connection may revert to slow start if the connection sits idle for too long. Idle time is server-dependent and can be included when determining the speed at which an idle connection can service an outgoing request.

Next, the TCP overhead (TCPO) is calculated (block 103). Each origin server in communication with the proxy has a unique TCP overhead time. Per Equation 2, the TCP overhead TCPOverhead can be calculated as follows:

$$TCP\text{Overhead} = \text{Three WayHandshake} + \text{SlowStart}OH \quad \text{Equation 2.}$$

where Three WayHandShake is the time required to establish a TCP connection using a three-way handshake and SlowStartOH is the slow start overhead. Note the three-way handshake has a lower bound of one roundtrip time.

Next, the request transfer time(RQT) is obtained (block 104). In the described embodiment, the request transfer time is an estimate of the time required for an entire request to reach an origin server. Thus, the request transfer time is simply the size of the request multiplied by the average connection speed for a particular origin server.

Finally, the idle time is obtained (block 105). The idle time is the length of time that a connection has been sitting idle. Idle time affects the selection of an optimal connection. After a certain idle period, connections can revert back to a slow start which can impact the response time of a sent request. Idle time is a function of sender (proxy) imposed flow control and specific knowledge of the origin server capabilities are used to determine if and when any idle connections will revert back to a TCP slow start. Upon completing the last time estimate, the routine returns.

Figure 10:
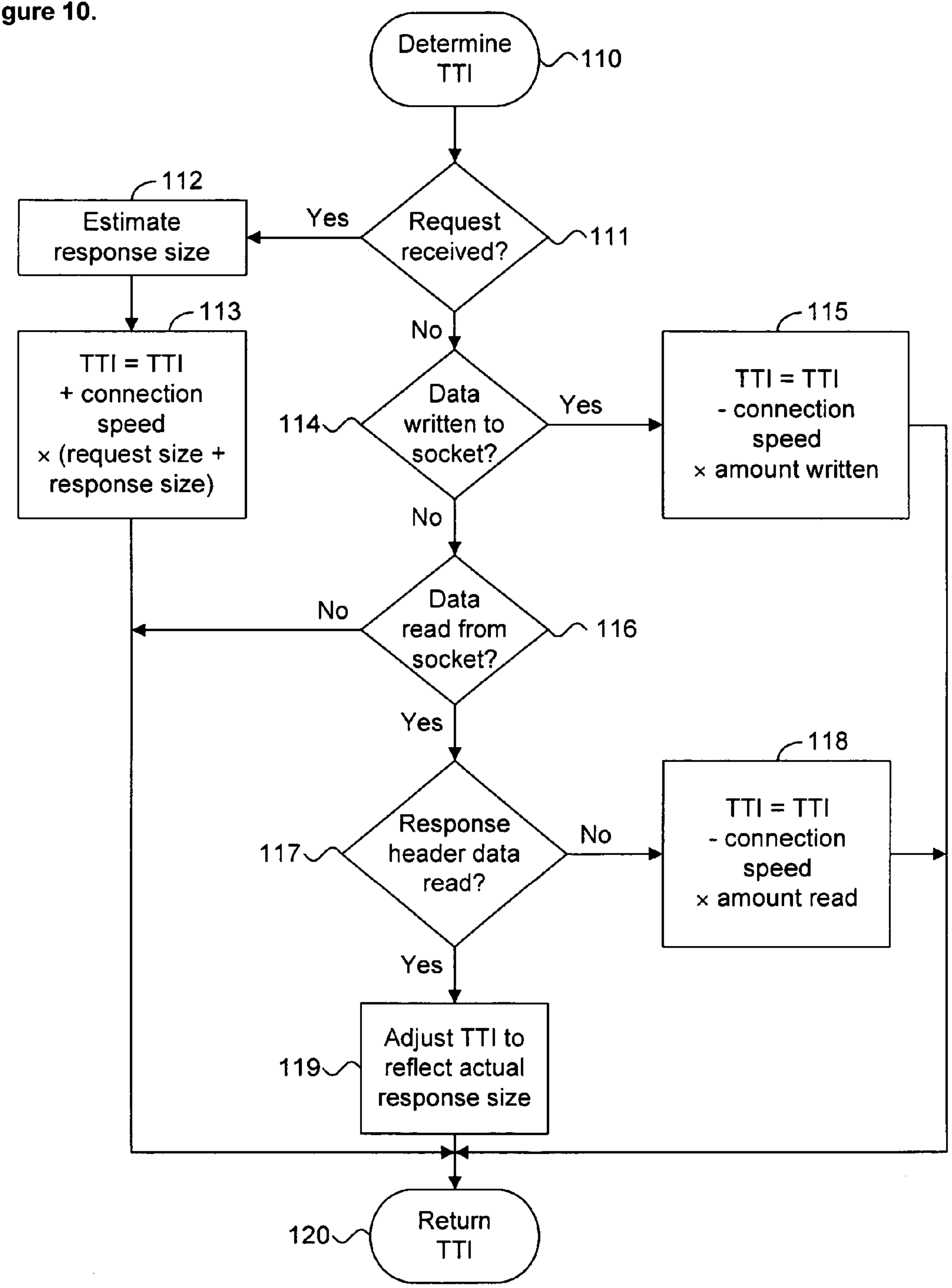
FIG. 10 is a flow diagram showing the routine for determining a time-to-idle for use in the method of FIG. 9.

FIG. 10 is a flow diagram showing the routine for determining a time-to-idle (TTI) 110 for use in the routine 100 of FIG. 9. The purpose of this routine is to continuously determine the estimated time-to-idle for a request concurrent to the receipt and processing of requests by the proxy. The time-to-idle for a particular connection is dynamically adjusted according to the nature of the request and responses serviced via the connection. Time-to-idle is influenced by the size of the request data not yet sent, the size of the response data not yet received, and the speed of the connection.

The size of the request data can be readily determined, as the proxy is required to read data sent from each client. However, estimating the size of the response data involves knowledge of the communication protocol being used. In the described embodiment, the size of the response data is approximated since the size of HTTP response data is not known until part of the response is received.

One way to approximate the response size is to base an estimate on the nature of the request and an average of historical response sizes for a particular origin server. Indicators of response size contained in an HTTP request include:

Request method used, such as GET, HEAD, PUT, POST, TRACE, and DELETE. Note that HEAD and TRACE responses do not contain entities. These response sizes equal the size of the header data and are relatively constant. DELETE responses can have small entity bodies containing a short description of the result. GET, PUT and POST responses can all contain entity bodies and have variable lengths.

Resource type, such as determined from the file extension within the URI. The resource type can be used to determine an average response size by resource type. The average sizes can be determined beforehand or maintained at runtime for a particular origin server.

"If-Modified-Since" header. A recent date stamp increases the likelihood of getting a short "304 Not Modified" response.

Once the headers of the response are received, a better estimate of response size is possible and the "Time-To-Idle" estimation can be modified accordingly. The response status code is first received and can give insight into the length of the response data. Similarly, "100," "300," "400," and "500" level status codes all have small response sizes, whereas "200" level status codes have larger response sizes. As the remainder of the header section is read, the accuracy of the estimate can be increased. For example, a content-length header will provide an exact length for the response.

Thus, the time-to-idle is determined based on what other requests have been received (blocks 111-113), what has been written to a socket (block 114-115), and what has been read from a socket (blocks 116-119). If a request has initially been received (block 111), the response size is estimated (block 112) as described above and the time-to-idle is calculated per Equation 3 as follows:

$$TTI = TTI + \text{ConnectionSpeed} \times (\text{RequestSize} + \text{ResponseSize}) \quad \text{Equation 3.}$$

If the data have been written to a socket (block 114), the time-to-idle is calculated per Equation 4 as follows:

$$TTI = TTI - \text{ConnectionSpeed} \times \text{AmountWritten} \quad \text{Equation 4.}$$

Finally, if the data have been written from a socket (block 116), and response header data has not been read (block 117), the time-to-idle is calculated per Equation 5 as follows:

$$TTI = TTI - \text{ConnectionSpeed} \times \text{AmountRead} \quad \text{Equation 5.}$$

Otherwise, if response header data has been read (block 117), the time-to-idle is adjusted to reflect the actual response size (block 119). Upon the determination of the time-to-idle, the routine returns the time-to-idle (block 120).

While the invention has been particularly shown and described as referenced to the embodiments thereof, those skilled in the art will understand that the foregoing and other changes in form and detail may be made therein without departing from the spirit and scope of the invention.

What is claimed is:

1. An apparatus for efficiently forwarding client requests in a distributed computing environment, comprising:

one or more network interfaces;

a processor;

a memory;

computer program code stored in a storage medium, wherein the computer program code comprises a socket module comprising computer-readable instructions operative to cause the processor to receive a plurality of client requests for forwarding;

a time estimates generator comprising computer-readable instructions operative to cause the processor to dynamically generate, concurrent to and during processing of each client request, time estimates of service availability based on a time-to-idle for sending the client requests over each of a plurality of managed network connections to a remote node, wherein time-to-idle for each managed network connection is calculated based on the amount of time that will elapse before an active managed network connection is usable for a subsequent client request; and a network connection manager comprising computer-readable instructions operative to cause the processor to select the managed network connection to the remote node with a substantially highest service availability and a substantially lowest time-to-idle and forwarding each client request to the remote node using the selected managed network connection.

2. An apparatus according to claim 1 wherein the network connection manager further comprises computer readable instructions operative to cause the processor to select a managed network connection to the remote node not actively sending a request with a zero time-to-idle and not subject to a slow start overhead incurred responsive to flow control imposed by the sending client.

3. An apparatus according to claim 2 wherein the network connection manager further comprises computer readable instructions operative to cause the processor to select a managed network connection to the remote node actively sending a request with a time-to-idle less than the slow start overhead, plus request transfer time if the network connection allows request pipelining.

4. An apparatus according to claim 3 wherein the network connection manager further comprises computer readable instructions operative to cause the processor to select a managed network connection not actively sending a request with a zero time-to-idle and subject to the slow start overhead.

5. An apparatus according to claim 4 wherein the network connection manager further comprises computer readable instructions operative to cause the processor to select a managed network connection to the remote node actively sending a request with a time-to-idle less than a network connection setup overhead, plus request transfer time if the network connection allows request pipelining.

6. An apparatus according to claim 5 wherein the network connection manager further comprises computer readable instructions operative to cause the processor to select a new managed network connection in the absence of an existing managed network connection with a time-to-idle less than the network connection setup overhead.

7. An apparatus according to claim 5 wherein the network connection manager further comprises computer readable instructions operative to cause the processor to select an existing managed network connection with the substantially lowest time-to-idle.

8. An apparatus according to claim 1, wherein the distributed operating environment is TCP/IP-compliant, and wherein the time estimates generator further comprises computer readable instructions operative to cause the processor to provide time estimates for each managed network connection to the remote node comprising at least one of TCP overhead, time-to-idle, idle time, and request transfer time, wherein idle time for each managed network connection is measured as an amount of time that has elapsed during which no network traffic is being sent or received over a network connection.

9. An apparatus according to claim 8, the managed network connection setup overhead comprises TCP overhead, and wherein the time estimates generator further comprises computer readable instructions operative to cause the processor to calculate the TCP overhead by adding a three-way way handshake overhead to a slow start overhead.

10. An apparatus according to claim 8, wherein the time estimates generator further comprises computer readable instructions operative to cause the processor to calculate the request transfer time by multiplying the size of the request by an average network connection speed for the remote node.

11. An apparatus according to claim 8, wherein the time estimates generator further comprises computer readable instructions operative to cause the processor to calculate the time-to-idle upon each receipt of a request by adding the time-to-idle to the product of an average network connection speed for the remote node multiplied by the sum of the request size and an estimated response size.

12. An apparatus according to claim 8, wherein the time estimates generator further comprises computer readable instructions operative to cause the processor to calculate the time-to-idle upon writing data to a socket by subtracting the time-to-idle from the product of an average network connection speed for the remote node multiplied by the amount of data written.

13. An apparatus according to claim 8, wherein the time estimates generator further comprises computer readable instructions operative to cause the processor to calculate the time-to-idle upon reading data from a socket, prior to header data, by subtracting the time-to-idle from the product of an average network connection speed for the remote node multiplied by the amount of data read.

14. In a network device operatively disposed in a communications path between a plurality of hosts, a method for efficiently forwarding client requests in a distributed computing environment, the method comprising:

maintaining a plurality of managed network connections with a remote node; receiving a plurality of client requests for forwarding;

dynamically generating, concurrent to and during processing of each client request, time estimates of service availability based on a time-to-idle for sending the client requests over each of the plurality of managed network connections to the remote node, wherein time-to-idle for each managed network connection is calculated based on the amount of time that will elapse before an active network connection is usable for a subsequent client request; and selecting the managed network connection to the remote node with a substantially highest service availability and a substantially lowest time-to-idle and forwarding each request to the remote node using the selected network connection.

15. A method according to claim 14, further comprising: selecting a managed network connection to the remote node not actively sending a request with a zero time-to-idle and not subject to a slow start overhead incurred responsive to flow control imposed by the sending client.

16. A method according to claim 15, further comprising: selecting a managed network connection to the remote node actively sending a request with a time-to-idle less than the slow start overhead, plus request transfer time if the network connection allows request pipelining.

17. A method according to claim 16,further comprising: selecting a managed network connection not actively sending a request with a zero time-to-idle and subject to the slow start overhead.

18. A method according to claim 17, further comprising: selecting a network connection to the remote node actively sending a request with a time-to-idle less than a network connection setup overhead, plus request transfer time if the network connection allows request pipelining.

19. A method according to claim 18, further comprising: selecting a new network connection to the remote node in the absence of an existing network connection with a time-to-idle less than the network connection setup overhead.

20. A method according to claim 18, further comprising: selecting an existing network connection to the remote node with the substantially lowest time-to-idle.

21. A method according to claim 14, wherein the distributed operating environment is TCP/IP-compliant, the method further comprising: providing time estimates for each network connection to the remote node comprising at least one of TCP overhead, time-to-idle, idle time, and request transfer time, wherein idle time for each network connection is measured as an amount of time that has elapsed during which no network traffic is being sent or received over a network connection.

22. A method according to claim 21, the network connection setup overhead comprises TCP overhead, the method further comprising: calculating the TCP overhead by adding a three-way handshake overhead to a slow start overhead.

23. A method according to claim 21, further comprising: calculating the request transfer time by multiplying the size of the request by an average network connection speed for the remote node.

24. A method according to claim 21, further comprising: calculating the time-to-idle upon each receipt of a request by adding the time-to-idle to the product of an average network connection speed for the remote node multiplied by the sum of the request size and an estimated response size.

25. A method according to claim 21, further comprising: calculating the time-to-idle upon writing data to a socket by subtracting the time-to-idle from the product of an average network connection speed for the remote node multiplied by the amount of data written.

26. A method according to claim 21, further comprising: calculating the time-to-idle upon reading data from a socket, prior to header data, by subtracting the time-to-idle from the product of an average network connection speed for the remote node multiplied by the amount of data read.

* * * * *